United States Patent [19]

Mizuno

[11] Patent Number: 4,979,757
[45] Date of Patent: Dec. 25, 1990

[54] OIL RING ASSEMBLY

[75] Inventor: Hatsutaro Mizuno, Kashiwazaki, Japan

[73] Assignee: Kabushiki Kaisha Riken, Tokyo, Japan

[21] Appl. No.: 439,585

[22] Filed: Nov. 21, 1989

[30] Foreign Application Priority Data

Nov. 24, 1988 [JP] Japan .................. 63-151839

[51] Int. Cl.$^5$ .............................. F16J 9/00
[52] U.S. Cl. .................. 277/216; 277/223; 277/236; 277/DIG. 6
[58] Field of Search ............ 277/141, 139, 140, 142, 277/223, 224, 216, 220, DIG. 6, 236

[56] References Cited

U.S. PATENT DOCUMENTS

| | | |
|---|---|---|
| 2,807,511 | 9/1957 | Fleming ................. 277/216 |
| 3,522,949 | 8/1970 | Wells ................... 277/140 |
| 4,299,401 | 11/1981 | McCormick ............ 277/216 |
| 4,407,515 | 10/1983 | Naito ................... 277/141 |
| 4,557,492 | 12/1985 | Tsuchiya et al. ........ 277/224 |
| 4,643,079 | 2/1987 | Brann et al. ........... 277/224 |
| 4,747,602 | 5/1988 | Kobayashi et al. ...... 277/216 |

Primary Examiner—Allan N. Shoap
Assistant Examiner—Daniel G. DePumpo
Attorney, Agent, or Firm—Finnegan, Henderson, Farabow, Garrett & Dunner

[57] ABSTRACT

A compound steel oil ring assembly has nitrided side rails and a spacer expander. The opposing end portions of each side rail are treated to prevent formation of a nitride layer solely at these portions in order to reduce their hardness. This reduces the degree to which the corner portions of the opposing ends wear away the side surfaces of a piston oil ring groove.

2 Claims, 2 Drawing Sheets

OIL RING ASSEMBLY

BACKGROUND OF THE INVENTION

This invention relates to a compound oil ring and, more particularly, to improvements in a compound steel oil ring assembly having a spacer expander and side rails disposed above and below the spacer expander and brought into pressured contact with the inner wall of the cylinder of an internal combustion engine by the spacer expander.

In order to improve the wear resistance of the side rails in a compound oil ring assembly disposed in the oil ring groove of a piston, the conventional practice is to produce so called "chrome-plated side rails" each of which has its outer circumferential surface or both its outer and inner circumferential surfaces plated with chrome, and so called "nitrided side rails" each having its entire peripheral surface subjected to a nitriding treatment. These rails are installed in the internal combustion engine.

The amount of wear at the oil ring groove side surfaces produced by the contact between the nitrided side rails and chrome-plated side rails and these side surfaces is five times greater in the case of the nitrided side rails. In the case where the nitrided side rails are used, the deterioration in the side rail performance of the side rails due to wear is great and a large amount of oil is consumed.

It has been clarified that this wear phenomenon at the oil ring groove of the piston is characteristic of the nitrided side rails, and that groove wear is caused by the corners at the opening between the opposing ends of the nitrided side rails.

The nitrided side rails have a high surface hardness of Hv 1100-1200 and possess the aforementioned opening between the opposing ends of the rail. During operation of the engine, therefore, the opening vibrates so that its corners cut into the side surfaces of the piston oil ring groove, thereby causing wear.

SUMMARY OF THE INVENTION

Accordingly, an object of the present invention is to provide an oil ring assembly having nitrided side rails for a compound steel oil ring adapted to prevent wear of the side surfaces of an oil ring groove, thereby solving the aforementioned problem encountered in the prior art.

According to the present invention, the foregoing object is attained by providing a compound steel oil ring assembly mounted in a ring groove of a piston, comprising a pair of ring-shaped side rails each having opposing end portions treated to prevent nitriding, and a spacer expander for bringing the side rails into contact with an inner wall of the ring groove, each of the side rails being subjected to a nitriding treatment to form a nitride layer thereon except at the opposing end portions.

In accordance with the invention, both opposing end portions of each side rail are coated with a nitriding preventing agent before the side rail is subjected to the nitriding treatment. As a result, a nitride layer is prevented from forming on the coated opposing end portions of the side rail, thereby reducing hardness at these portions. This diminishes the degree to which the side surfaces of the piston oil ring groove are worn away when the opposing end portions of the side rail vibrate during operation of the engine.

According to the present invention, the amount of wear sustained by the side surfaces of the oil ring groove can be reduced by the same degree achieved with the conventional chrome-plated side rails. This is accomplished by a simple expedient, namely by treating the opposing end portions of the side rails so as to prevent nitriding. Moreover, wear resistance can be improved to the same level as that of the conventional nitrided side rails.

Other objects of the present invention will become clear from the description and claims based on the accompanying drawings.

DESCRIPTION OF THE PREFERRED EMBODIMENT

An embodiment of an oil ring assembly according to the present invention will now be described in detail with reference to the accompanying drawings.

Figure 1:
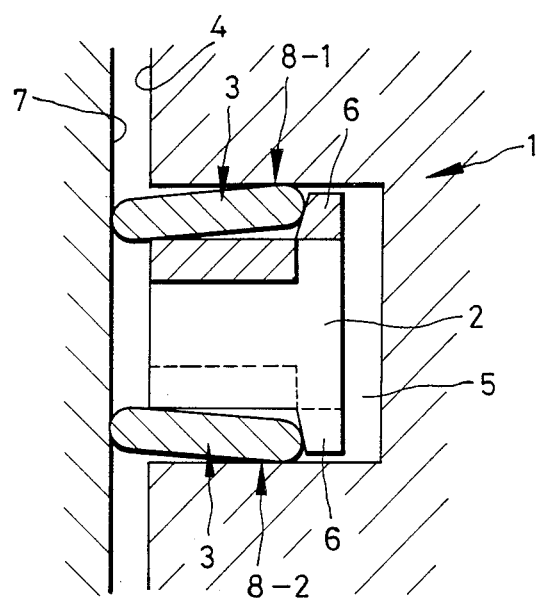
FIG. 1 is a sectional view illustrating a compound steel oil ring assembly according to the invention in a state mounted in a piston oil ring groove.

With reference to FIG. 1, there is shown a compound steel oil ring assembly 1 having a spacer expander 2 and two side rails 3 disposed above and below the spacer expander 2. The oil ring assembly 1 is mounted in an oil ring groove 5 formed in the wall of a piston 4 and having side surfaces 8-1, 8-2.

The spacer expander 2 has a shoulder 6 which, in this embodiment, is contacted by the inner circumferential surface of each side rail 3. Owing to the pressure applied to the side rails 3 by the shoulder 6, the side rails 3 are brought into contact with an inner wall 7 of a cylinder and the side surfaces 8-1, 8-2 of the oil ring groove 5.

Figure 2:
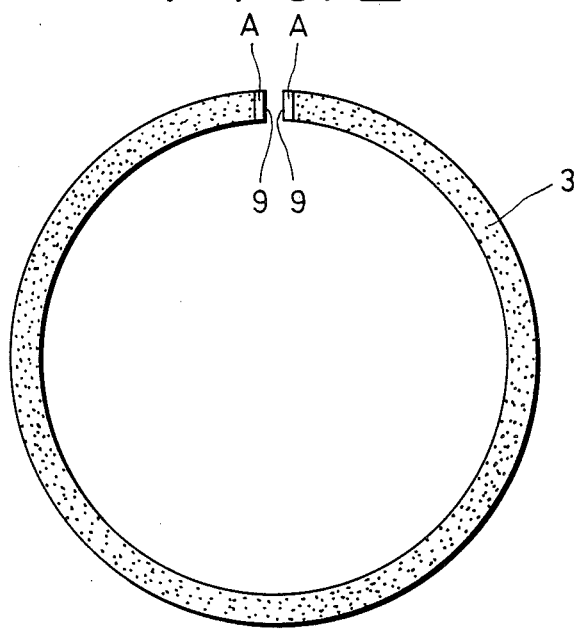
FIG. 2 is a plan view of a side rail included in the oil ring assembly.

As shown in FIG. 2, each oil ring 3 has opposing end portions 9. Whereas the entire peripheral surface of a side rail is nitrided in the prior art, regions A of the opposing end portions 9 are treated to prevent the formation of a nitride layer in accordance with the present invention. It will suffice if region A is on the order of 5 mm or less. By way of example, only the regions A at the opposing end portions of the side rail 3 are coated with a nitriding preventing agent before the side rail is subjected to a nitriding treatment.

An example of this nitriding preventing agent is sold under the brand name "NO-TRIDE", manufactured by the Park Chemical Company in the United States. This agent is applied uniformly by a paint brush to the opposing end portions of the side rail before the nitriding treatment but after the side rail has been degreased and washed. The side rail is then allowed to dry naturally for about 60 minutes in the atmosphere. Thereafter, the side rail is heated at 570° for 130 minutes in, say, an ammonia gas atmosphere to perform nitriding.

By performing nitriding after application of the nitriding preventing agent, some increase in hardness is produced but overall hardness is held to a low Hv 350-550.

Figure 3:
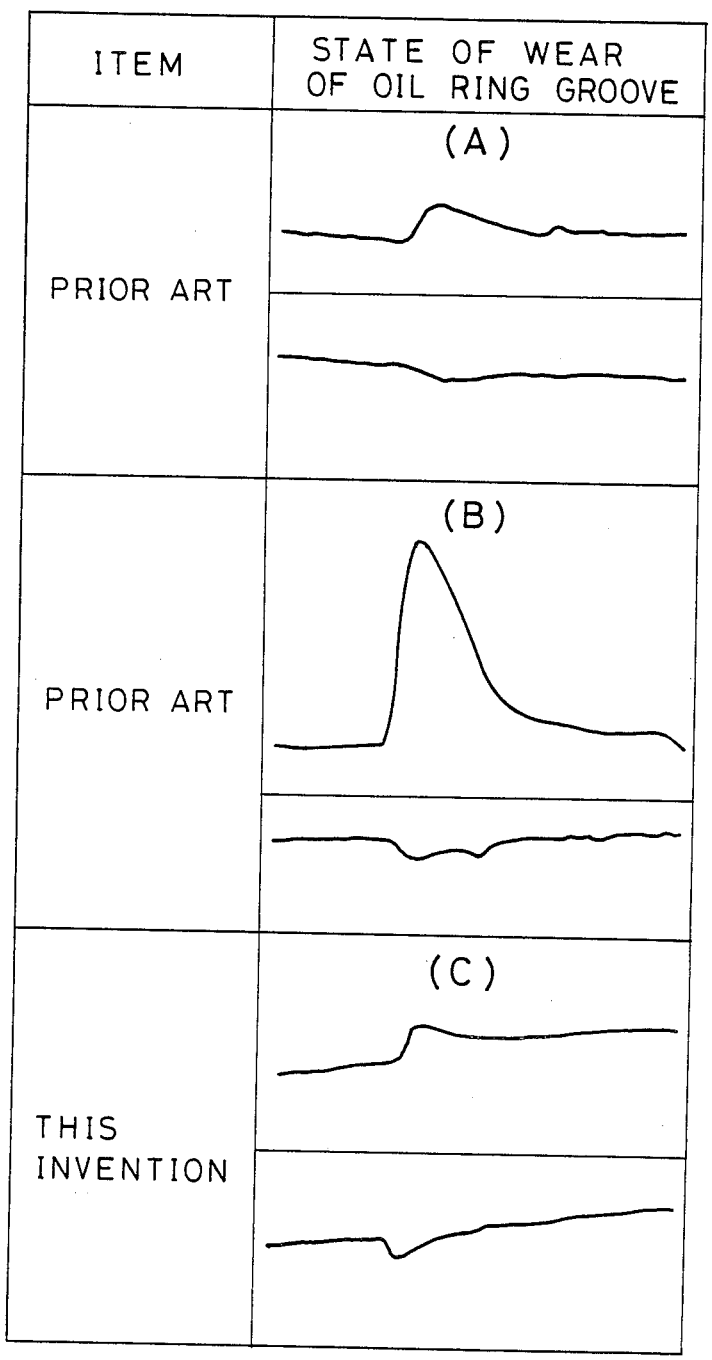
FIG. 3 is a diagram showing the results of wear tests, in which (A) shows the results obtained using conventional chrome-plated side rails, (B) the results obtained using nitrided side rails, and (C) the results obtained using the nitrided side rails according to the present invention.

FIG. 3 shows the results of experiments using the conventional piston rings and the piston ring of the present invention. FIG. 3(A) illustrates the state of wear of a piston oil ring groove when the conventional chrome-plated side rails are used, (B) the state when the conventional nitrided side rails are used, and (C) the state when the side rails of the present invention are used. Each of the upper curves in these views relates to the side surface 8-1, and each of the lower curves relates to the side surface 8-2. In accordance with the results of measurement, maximum amount of wear of the side surface 8-1 was 4.2 μm and maximum amount of wear of the side surface 8-2 was 1.8 μm with the chrome-plated side rails. With the conventional nitrided side rails, maximum amount of wear of the side surface 8-1 was 22.0 μm and maximum amount of wear of the side surface 8-2 was 2.5 μm. In accordance with the side rails of the present invention, maximum amount of wear of the side surface 8-1 was 4.5 μm and maximum amount of wear of the side surface 8-2 was 2.5 μm.

In a piston provided with the side rails having their opposing end portions treated to prevent nitriding in accordance with the invention, the side surfaces 8-1, 8-2 of the oil ring groove 5 are cut away less by the opposing end portions of the side rails even when vibration is produced by running of the engine. This makes it possible to obtain excellent results, namely oil groove side surface wear equivalent to that obtained with the conventional chrome-plated side rails.

The present invention is not limited to the foregoing embodiments but can be modified in various ways based on the gist thereof without departing from the scope of the claims.

What is claimed is:

1. A steel oil ring assembly adapted for use in an oil ring groove of a piston and cylinder combination in which the groove has opposed inner side walls, said assembly comprising a pair of ring-shaped steel side rails each having an inner and outer side surface and an outer peripheral surface and terminating in opposing end portions in the circumferential direction, said end portions including surfaces and edges, said edges defining the perimeter of each respective end portion, and a spacer expander for spreading apart said rails and bringing at least a part of their outer side surfaces into contact with the opposed inner side walls of the ring groove and for bringing the outer peripheral surface into contact with the inner wall of the cylinder, each of said side rails having a nitride layer on at least the outer side surface thereof except on the surfaces and edges of said opposing end portions and in the regions of the rails immediately adjacent their end portions about each said perimeter.

2. The assembly of claim 1, wherein said regions extend back in the circumferential direction from each opposing end portion a distance of up to approximately 5 mm.

* * * * *